(12) United States Patent
Thorn (10) Patent No.: US 9,711,135 B2
(45) Date of Patent: Jul. 18, 2017

(54) ELECTRONIC DEVICES AND METHODS FOR COMPENSATING FOR ENVIRONMENTAL NOISE IN TEXT-TO-SPEECH APPLICATIONS

(71) Applicant: Sony Corporation, Tokyo (JP)

(72) Inventor: Ola Thorn, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 329 days.

(21) Appl. No.: 14/374,170

(22) PCT Filed: Dec. 17, 2013

(86) PCT No.: PCT/JP2013/084395
§ 371 (c)(1),
(2) Date: Jul. 23, 2014

(87) PCT Pub. No.: WO2015/092943
PCT Pub. Date: Jun. 25, 2015

(65) Prior Publication Data
US 2016/0275936 A1    Sep. 22, 2016

(51) Int. Cl.
*G10L 13/08*    (2013.01)
*G10L 13/033*    (2013.01)
(Continued)

(52) U.S. Cl.
CPC ........ *G10L 13/0335* (2013.01); *G10L 13/047* (2013.01); *G10L 13/08* (2013.01);
(Continued)

(58) Field of Classification Search
CPC . G10L 13/027; G10L 13/0335; G10L 15/063; G10L 13/047; G10L 21/003; G10L 21/0216; G10L 13/08; G10L 2015/0631
(Continued)

(56) References Cited

U.S. PATENT DOCUMENTS 8,571,871 B1 * 10/2013 Stuttle .................. G10L 13/033
704/260
2002/0128838 A1    9/2002 Veprek
(Continued)

OTHER PUBLICATIONS

International Preliminary Report on Patentability for corresponding PCT application No. PCT/JP2013/084395 mailed Jun. 30, 2016, 7 pages.
(Continued)

*Primary Examiner* — Tammy Paige Goddard
*Assistant Examiner* — Bharatkumar Shah
(74) *Attorney, Agent, or Firm* — Myers Bigel, P.A.

(57) ABSTRACT

A method by an electronic device for compensating for environmental noise in text-to-speech (TTS) speech output includes: measuring environmental noise using a microphone signal; determining sound characteristics of the measured environmental noise; dynamically predicting expected future sound characteristics of the environmental noise based on the determined sound characteristics of the measured environmental noise; receiving a text input at a TTS engine at the device, with the TTS engine configured to convert the text input into a speech output signal; determining text characteristics of the text input at the TTS engine; and at the TTS engine, dynamically adapting the speech output signal based on the determined text characteristics of the text input and the predicted expected future sound characteristics of the environmental noise.

17 Claims, 6 Drawing Sheets

(51) Int. Cl.
*G10L 13/047* (2013.01)
*G10L 15/06* (2013.01)
*G10L 21/003* (2013.01)
*G10L 21/0216* (2013.01)

(52) U.S. Cl.
CPC .......... *G10L 15/063* (2013.01); *G10L 21/003* (2013.01); *G10L 21/0216* (2013.01); *G10L 2015/0631* (2013.01)

(58) Field of Classification Search
USPC ........................................................ 704/260
See application file for complete search history.

(56) References Cited

U.S. PATENT DOCUMENTS

2003/0061049 A1\* 3/2003 Erten ...................... G10L 13/08
 704/260
2012/0296654 A1\* 11/2012 Hendrickson ........... G10L 13/02
 704/260

OTHER PUBLICATIONS

International Search Report and Written Opinion for PCT/JP2013/084395 mailed May 28, 2014.

\* cited by examiner

ELECTRONIC DEVICES AND METHODS FOR COMPENSATING FOR ENVIRONMENTAL NOISE IN TEXT-TO-SPEECH APPLICATIONS

CROSS-REFERENCE TO RELATED APPLICATION

This application is a 35 U.S.C. §371 national stage application of PCT International Application No. PCT/JP2013/084395, filed on 17 Dec. 2013, the disclosure and content of which is incorporated by reference herein as if set forth in its entirety.

BACKGROUND

Text-to-speech (TTS) capabilities are being increasingly incorporated into a wide variety of electronic devices. For example, TTS is used to read articles, emails, text messages and the like and to communicate with intelligent personal assistant applications on electronic devices such as computers (e.g., portable computers) and telephones. TTS is also used for navigation with such devices as well as dedicated global positioning system (GPS) devices.

The environment in which TTS is used may be noisy due to any number of factors such background conversation, music, passing trains and so forth. One solution is to detect the ambient or environmental noise and increase the volume of the TTS output in response to increased environmental noise. However, there is an upper limit to volume control which may not be sufficient for certain environmental noise. Prolonged periods with high volume can also be annoying for the user.

SUMMARY

According to a first aspect, embodiments of the invention are directed to a method by an electronic device for compensating for environmental noise in text-to-speech (TTS) speech output. The method includes: measuring environmental noise using a microphone signal; determining sound characteristics of the measured environmental noise; dynamically predicting expected future sound characteristics of the environmental noise based on the determined sound characteristics of the measured environmental noise; receiving a text input at a TTS engine at the device, with the TTS engine configured to convert the text input into a speech output signal; determining text characteristics of the text input at the TTS engine; and, at the TTS engine, dynamically adapting the speech output signal based on the determined text characteristics of the text input and the predicted expected future sound characteristics of the environmental noise. The speech output signal is dynamically adapted by varying the pace of the speech output and/or varying the pitch of the speech output.

Dynamically predicting expected future sound characteristics of the environmental noise may include characterizing a time-varying pattern of the expected future sound characteristics of the environmental noise based on a time-varying pattern observed in determined sound characteristics of previously occurring environmental noise. In some embodiments, characterizing a time-varying pattern of the expected future sound characteristics of the environmental noise includes characterizing expected differences over time in the volume of the environmental noise based on differences over time in volume of previously occurring environmental noise.

In some embodiments, characterizing a time-varying pattern of the expected future sound characteristics of the environmental noise includes predicting timing of gaps in the environmental noise where the environmental noise volume has less than a threshold amplitude based on differences over time in volume of previously occurring environmental noise. The speech output signal may be dynamically adapted by increasing the pace of the speech output such that the speech output is fully carried out within one of the predicted gaps. The speech output signal may be dynamically adapted by interrupting the speech output at an interrupted location of the speech output signal at the end of one of the predicted gaps and resuming the speech output from the interrupted location of the speech output signal at a subsequent predicted gap.

In some embodiments, characterizing a time-varying pattern of the expected future sound characteristics of the environmental noise includes characterizing expected differences over time in the frequency spectrum of the environmental noise based on differences over time in the frequency spectrum of the previously occurring environmental noise. The speech output signal may be dynamically adapted by varying the pitch of the speech output to compensate for the expected differences over time in the frequency spectrum of the environmental noise.

In some embodiments, dynamically predicting expected future sound characteristics of the environmental noise based on the determined sound characteristics of the measured environmental noise includes generating values of a time-varying control curve representing an expected pattern of the environmental noise. The speech output signal may be dynamically adapted by dynamically adapting the speech output signal using values of the time-varying control curve.

In some embodiments, the method includes operating the device in a learning mode to determine sound characteristics of the measured environmental noise.

The method may include determining a location of the device, and dynamically predicting expected future sound characteristics of the environmental noise may be based on previously known sound characteristics of environmental noise at the location.

In some embodiments, characterizing a time-varying pattern of the expected future sound characteristics of the environmental noise comprises characterizing expected differences over time in the direction of the environmental noise based on differences over time in direction of previously occurring environmental noise. Dynamically adapting the speech output signal may include panning the speech output to compensate for the expected differences over time in the direction of the environmental noise.

According to a second aspect, embodiments of the invention are directed to a method by an electronic device for compensating for environmental noise in text-to-speech (TTS) speech output. The method includes: measuring environmental noise using a microphone signal; determining identifying characteristics of the measured environmental noise; and determining whether the identifying characteristics of the measured environmental noise match those corresponding to an identified environmental noise source that is stored in an environmental noise library at the device. If it is determined that the identifying characteristics of the measured environmental noise match those corresponding to an identified environmental noise source that is stored in the environmental noise library, the method includes: receiving a text input at a TTS engine at the device, with the TTS engine configured to convert the text input into a speech output signal; and dynamically adapting the speech output signal based on a time-varying pattern of sound characteristics of the identified environmental noise source, with the time-varying pattern being stored in the environmental noise library. The speech output signal is dynamically adapted by varying the pace of the speech output and/or varying the pitch of the speech output. In some embodiments, if it is determined that the identifying characteristics of the measured environmental noise do not match those corresponding to an identified environmental noise source that is stored in the environmental noise library, the method includes operating the device in a learning mode including: learning identifying characteristics of the measured environmental noise; learning a time-varying pattern of sound characteristics of the environmental noise; and storing the identifying characteristics and the time-varying pattern of sound characteristics as an identified environmental noise source in the environmental noise library.

The identified environmental noise source may be audio from a media file. The identified environmental noise source may be one or more persons in a conversation. The identified environmental noise source may be a conversation type.

According to a third aspect, embodiments of the invention are directed to an electronic device configured to compensate for environmental noise in TTS speech output. The device includes: microphone configured to measure environmental noise; an environmental noise analysis circuit; and a TTS processor. The environmental noise analysis circuit is configured to: determine sound characteristics of environmental noise measured by the microphone; and predict future expected sound characteristics of the environmental noise based on the determined sound characteristics of the measured environmental noise. The TTS processor is configured to: receive a text input and covert the text input into a speech output signal; determine text characteristics of the text input; and adapt the speech output signal based on the determined text characteristics of the text input and the predicted expected sound characteristics of the environmental noise. The TTS processor is configured to adapt the speech output signal by varying the pace of speech output and/or varying the pitch of the speech output.

In some embodiments, the environmental noise analysis circuit is configured to characterize a time-varying pattern of the expected future sound characteristics of the environmental noise based on a time-varying pattern observed in determined sound characteristics of previously occurring environmental noise to predict future expected sound characteristics of the environmental noise. In some embodiments, the environmental noise analysis circuit is configured to predict timing of gaps in the environmental noise where the environmental noise volume has less than a threshold amplitude based on differences over time in volume of previously occurring environmental noise. The TTS processor may be configured to adapt the speech output signal by increasing the pace of the speech output such that the speech output is fully carried out within one of the predicted gaps. The TTS processor may be configured to adapt the speech output signal by interrupting the speech output at an interrupted location of the speech output signal at the end of one of the predicted gaps and resuming the speech output from the interrupted location of the speech output signal at a subsequent predicted gap.

The environmental noise analysis circuit may be configured to characterize expected differences over time in the frequency spectrum of the environmental noise based on differences over time in the frequency spectrum of the previously occurring environmental noise and the TTS processor may be configured to vary the pitch of the speech output to compensate for the expected differences over time in the frequency spectrum of the environmental noise.

According to a fourth aspect, embodiments of the invention are directed to a method by an electronic device for compensating for environmental noise in text-to-speech (TTS) speech output. The method includes: determining one or more identifying location characteristics associated with a location of the device; and determining whether the identifying location characteristics match those corresponding to an identified location that is stored in a location library at the device. If the identifying location characteristics match those corresponding to an identified location that is stored in the location library at the device, the method includes: receiving a text input at a TTS engine at the device, the TTS engine configured to convert the text input into a speech output signal; and dynamically adapting the speech output signal based on a time-varying pattern of sound characteristics of environmental noise at the identified location, the time-varying pattern being stored in the location library. If the identifying location characteristics do not match those corresponding to an identified location that is stored in the location library at the device, the method includes operating the device in a learning mode including: learning one or more identifying location characteristics associated with the location of the device; measuring environmental noise using a microphone signal; learning a time-varying pattern of sound characteristics of the environmental noise; and storing the one or more identifying location characteristics and time-varying pattern of sound characteristics as an identified location in the location library. In some embodiments, the identifying location characteristics are associated with a GPS location or signal. In some embodiments, the identifying location characteristics are associated with a WiFi network or an identification thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a," "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" and "processor" may take the form of digital circuitry, such as computer-readable program code executed by an instruction processing device(s) (e.g., general purpose microprocessor and/or digital signal microprocessor), and/or analog circuitry. The operations that are described below with regard to the figures can therefore be at least partially implemented as computer-readable program code executed by a computer (e.g., microprocessor).

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Generally speaking, embodiments of the invention are directed to devices and methods for compensating for ambient, background or environmental noise in text-to-speech (TTS) applications. As is known to those of skill in the art, TTS is a type of speech synthesis wherein textual input is converted into speech output. Different environmental noise sources can create different challenges with regard to the intelligibility of the TTS speech output.

Figure 1:
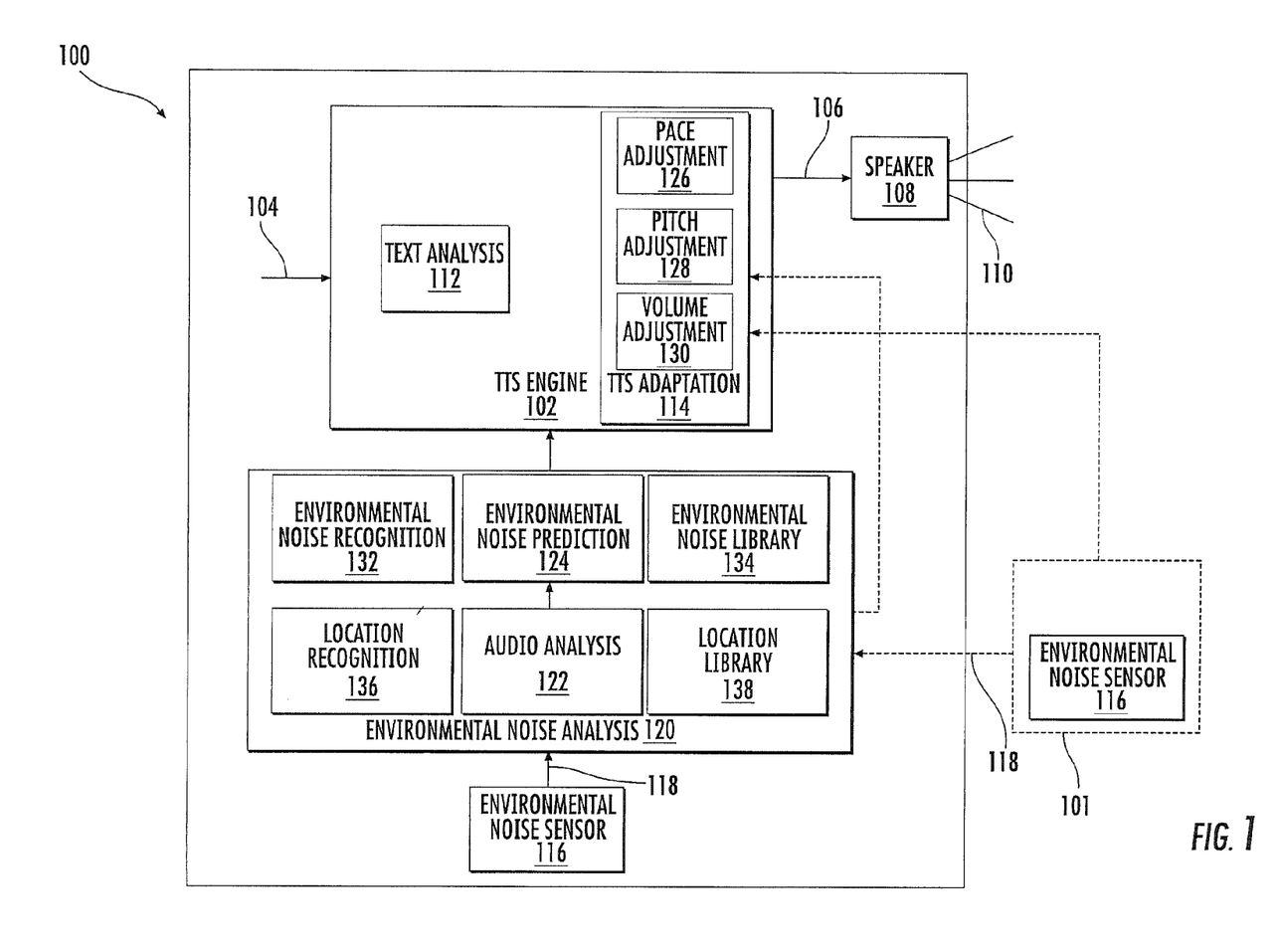
FIG. 1 is a block diagram of an electronic device according to some embodiments of the present invention.

An electronic device 100 according to some embodiments of the invention is illustrated in FIG. 1. The electronic device 100 includes a text-to-speech (TTS) engine or processor 102 that is configured to receive an input 104 and convert the input 104 to a speech output signal 106. The speech output signal 106 is received at one or more speakers or transducers 108 which are configured to output a speech output 110 (e.g., synthesized speech). The TTS engine 102 includes a text analysis module 112 and a TTS adaptation circuit or processor 114; these components will be described in greater detail below.

In some embodiments, the input 104 is a text input 104 (e.g., a text input signal) such that the speech output signal 106 and the speech output 110 is based on text in the text input 104. Although the input 104 is generally referenced as a text input 104 below, it will be appreciated that the input 104 can take other forms (e.g., the input may be a TTS input 104). For example, the speech output signal 106 and the speech output 110 may be used as a substitute for a user's voice. The speech output signal 106 and the speech output 110 may be translated speech and the input 104 may be pre-translated speech (e.g., speech input by the user in a different language). The input 104 may also be input initiated by, for example, a person using assistive input technology. The input 104 may be signals from electrodes or other sensors in a subvocal recognition system. The input 104 may be signals that are generated from eye movement, mouth/tongue movement and the like. The input 104 may be signals from a brain computer or a brain-computer interface (e.g., neural signals).

A user of the device 100 listens to the speech output 110 in TTS applications. However, environmental noise (e.g., ambient or background noise) may adversely affect the intelligibility of the speech output 110.

The device 100 may include at least one environmental noise sensor 116 such as a microphone 116 that measures or senses the environmental noise. The microphone 116 provides a microphone signal 118 to an environmental noise analysis circuit or processor 120. The environmental noise analysis processor 120 may include an audio analysis module 122 that is configured to perform a real time audio analysis of environmental noise measured by the microphone 116. The audio analysis module 122 determines sound characteristics including the amplitude (volume) and frequency levels associated with the captured environmental noise.

In some embodiments, the microphone 116 may be located in another device 101. For example, the microphone 116 could be in a car, a headset or another electronic device. The device 101 may communicate (e.g., wirelessly) with the device 100 and provide the microphone signal 118 to the device 100.

An environmental noise prediction module 124 is configured to predict expected future sound characteristics of the environmental noise based on the sound characteristics determined by the audio analysis module 122. In some embodiments, the environmental noise prediction module 124 characterizes a time-varying pattern of the expected future sound characteristics of the environmental noise based on a time-varying pattern observed in determined sound characteristics of previously occurring environmental noise. In some embodiments, the environmental noise prediction module 124 generates values of a time-varying control curve representing an expected pattern of the environmental noise. The control curve may be constantly or dynamically reconfigured based on the measured environmental noise.

Figure 2:
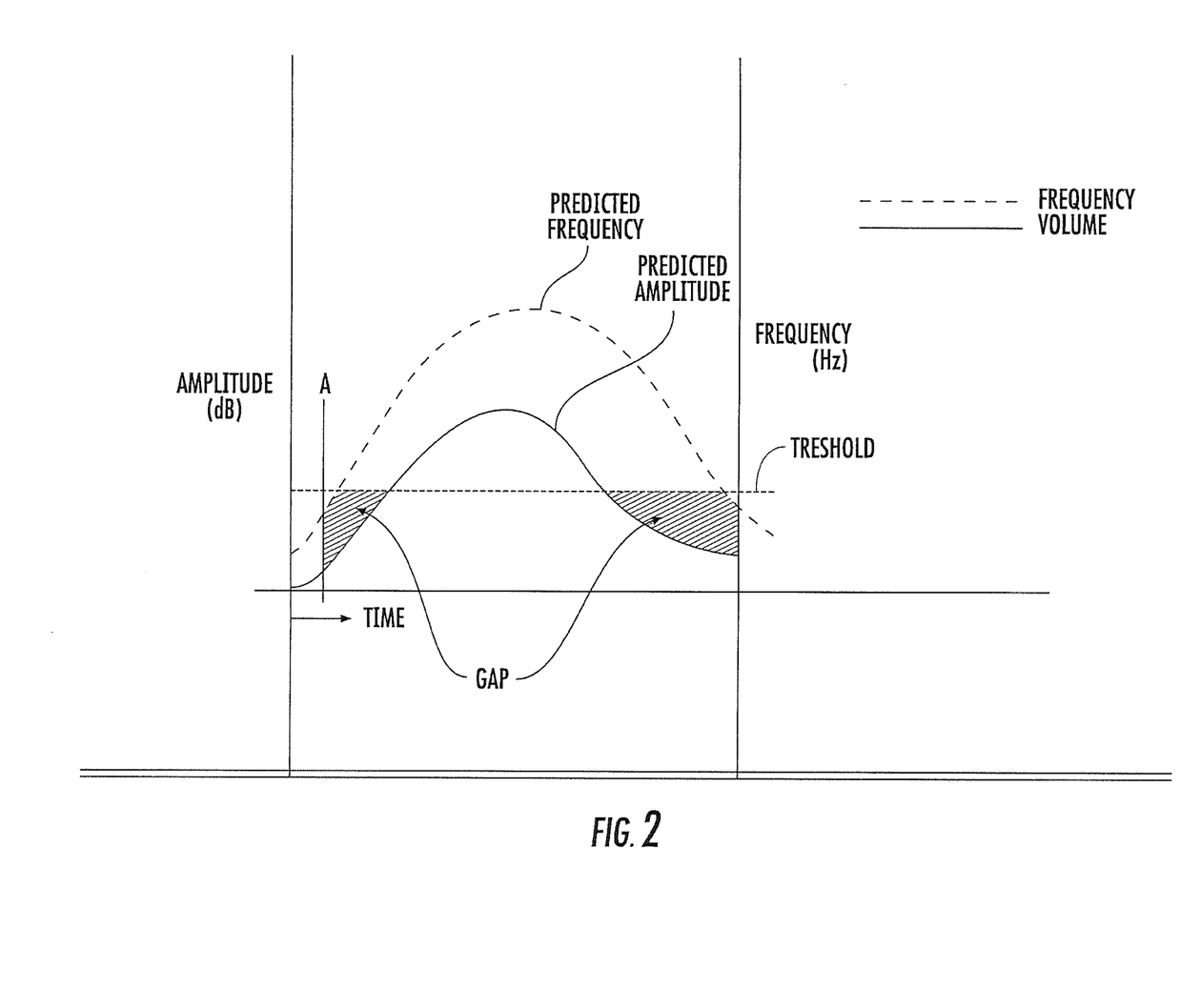
FIG. 2 is a chart illustrating an exemplary time-varying pattern of predicted sound characteristics of environmental noise using the device of FIG. 1.

FIG. 2 illustrates an exemplary control curve representing an expected pattern of environmental noise. The primary source of the environmental noise in FIG. 2 may be a passing train, for example. The curve shown in FIG. 2 may represent predicted sound characteristics by the environmental noise prediction module 124 after analyzing a relatively short sample of measured environmental noise (e.g., up to point "A" in time). The environmental noise prediction module 124 may recognize the gradually increasing amplitude or volume of the noise as well as the gradually increasing frequency as the train approaches. In some embodiments, and as described in more detail below, the environmental noise analysis processor 120 may also recognize identifying characteristics of the environmental noise source (e.g., a train) to assist in generating the predicted noise pattern.

As seen in FIG. 2, the environmental noise prediction module 124 may characterize expected differences over time in the amplitude (volume) of the environmental noise based on differences over time in volume of previously occurring environmental noise. The environmental noise prediction module 124 may predict timing of gaps in the environmental noise where the environmental noise has less than a threshold amplitude or volume based on differences over time in volume of previously occurring environmental noise. The environmental noise prediction module 124 may also characterize expected differences over time in the frequency spectrum of the environmental noise based on differences over time in the frequency spectrum of the previously occurring environmental noise.

Referring again to FIG. 1, the text analysis module 112 is configured to analyze the text input 104 and determine characteristics thereof. For example, the text analysis module 112 may determine how many words are in the text input, the minimum amount of time needed to output the text input as an intelligible speech output, whether any words need emphasis and/or extra output time (e.g., an obscure word) and so forth.

The TTS adaptation processor 114 is configured to dynamically adapt the speech output signal 106 based on the determined characteristics of the text input and the predicted expected future sound characteristics of the environmental noise. The TTS adaptation processor 114 has a pace adjustment module 126 configured to vary the pace of the speech output 110. The TTS adaptation processor 114 has a pitch adjustment module 128 configured to vary the pitch of the speech output 110. The pitch adjustment module 128 may include an electronic filter. The TTS adaptation processor 114 may also have a volume adjustment module 130 configured to vary the amplitude or volume of the speech output 110 (or portions thereof for emphasis). The volume adjustment module 130 may include an amplifier.

The pace adjustment module 126 may increase the pace of the speech output signal 106 such that the speech output 110 is carried out within one or more of the predicted gaps where the environmental noise has less than a threshold amplitude. The pace adjustment module 126 may be configured to adapt the speech output signal 106 by increasing the pace of the speech output 110 such that the speech output 110 is fully carried out within one of the predicted gaps. The pace adjustment module 126 may be configured to adapt the speech output signal 106 by interrupting the speech output 110 at an interrupted location of the speech output signal 106 (or the text corresponding thereto) at the end of one of the predicted gaps and resuming the speech output 110 from the interrupted location of the speech output signal 106 (or the text corresponding thereto) at a subsequent predicted gap.

Using the passing train example of FIG. 2, the pace adjustment module 126 may increase the pace of the speech output signal 106 such that the speech output 110 corresponding to the text input 104 is fully carried out in the first gap, e.g., as the train is approaching but before it creates sufficient background noise to make the speech output 110 unintelligible. The pace adjustment module 126 may also interrupt the speech output 110 as the predicted sound amplitude reaches the threshold amplitude. The pace adjustment module 126 may then resume the speech output 110 at the beginning of the second gap, e.g., after the train has passed and is a sufficient distance from the device to allow intelligible speech output.

The pitch adjustment module 128 may vary the pitch of the speech output 110 to compensate for the predicted differences over time in the frequency spectrum of the environmental noise. As illustrated in FIG. 1, the environmental noise analysis processor 120 can provide the determined sound characteristics of the measured sound to the TTS adaptation processor 114. In some embodiments, the environmental noise analysis processor 120 provides the determined frequencies of the measured environmental noise to the TTS adaptation processor 114 or the pitch adjustment module 128 such that the pitch of the speech output 110 can be varied in real time to compensate for changes in frequencies of the environmental noise and to "cut through" the environmental noise.

In some embodiments, the at least one environmental noise sensor 116 may detect the direction or location of the environmental noise or sound. For example, the at least one environmental noise sensor 116 may include a plurality of microphones and/or a gyroscope and/or other suitable device(s) to detect the location of the noise (e.g., the direction from which the noise is emanating). The at least one speaker 106 may comprise a multi-directional speaker or a plurality of speakers that are configured for panning the speech output 110. Therefore, in some embodiments, the TTS adaptation processor 114 may be configured to pan the speech output 110 and/or control 3D audio aspects of the speech output 110 in response to directional sound characteristics of the measured environmental noise. In some embodiments, the TTS adaptation processor 114 may be configured to characterize (predict) a time-varying pattern of the expected future sound characteristics of the environmental noise including characterizing expected differences over time in the direction or location of the environmental noise based on differences over time in direction or location of previously occurring environmental noise. In some embodiments, the TTS adaptation processor 114 may dynamically adapt the speech output signal 106 by controlling 3D audio output and/or panning the audio output that makes up the speech output 110 (e.g., dynamically adapt the direction of the speech output 110). In some embodiments, the TTS adaptation processor 114 may adapt the direction of the speech output 110 in addition to adapting the pace, pitch and/or volume of the speech output 110.

It will be appreciated that devices and methods according to the invention may further change the intonation, dialect, voice, voice gender, choice of words, lengths of sentences, and so forth to further improve the intelligibility of the speech output 110.

In some embodiments, the environmental noise analysis processor 120 may recognize identifying sound characteristics of the environmental noise. The environmental noise analysis processor 120 may include an environmental noise recognition module 132 that interacts with an environmental noise library 134. The environmental noise recognition module 132 may determine identifying characteristics of the measured environmental noise and query the library 134 to determine whether the identifying characteristics match those corresponding to a pre-identified environmental noise source or type that is stored in the library 134. The environmental noise library 134 may include a time-varying pattern of sound characteristics for each environmental noise source stored therein.

Exemplary environmental noise sources include an airplane cabin, a train station (or a passing train), a song, audio from a movie or television show, participant(s) in a conversation and types of conversations.

For example, a song may have gaps in the audio amplitude (e.g., where the amplitude is less than a threshold) and the TTS speech output can be timed accordingly. Also, the environmental noise in an airplane cabin may have a relatively constant amplitude (e.g., from the engine) but with an oscillating frequency and the pitch of the TTS speech output can be varied accordingly. A participant in a conversation may speak with a known voice cadence and the pace and/or pitch of the TTS speech output can be varied based on the known voice cadence. In addition, the type of conversation may be determined based on identifying sound characteristics (e.g., the name of a politician or a sports team). It may be known that conversations involving politics or sports may be heated and/or fast-paced, and the TTS speech output may be paused until the conversation has ceased, for example.

The device 100, and more particularly the environmental noise analysis circuit 120, may be operated in a learning mode. In some embodiments, the device 100 operates in a learning mode for a certain amount of time to "learn" characteristics of the environmental noise such that a time-varying pattern of sound characteristics can be established for a particular environment. For example, the device 100 may operate in a learning mode for a number of seconds or minutes to learn time-varying patterns in the environmental noise, such as regular or irregular intervals of relatively high amplitude sound and/or timing of gaps as well as differences over time in the frequency spectrum. The device 100 may then be operated in a TTS mode and the time-varying pattern of sound characteristics can be used to adapt the speech output by adapting the pace, pitch and/or volume of the speech output to provide intelligible speech output in the learned environment. The device 100 may enter the learning mode automatically (e.g., upon receiving a TTS text input but prior to converting the input to a speech output). Alternatively, a user may manually place the device 100 in the learning mode, e.g., using a user input interface.

In other embodiments, the device 100 may automatically enter the learning mode when identifying characteristics of the environmental noise are not recognized or are not present in the environmental noise library 134. As described above, the environmental noise recognition module 132 may make a determination as to whether identifying characteristics of the measured environmental noise match those of an identified environmental noise source that is stored in the environmental noise library 134. If the identifying characteristics of the measured environmental noise do not match those of an identified environmental noise source that is stored in the environmental noise library 134, the device 100 may switch to operate in a learning mode to learn identifying characteristics of the environmental noise that is being measured and learn a time-varying pattern of sound characteristics of the environmental noise. The identifying characteristics and the time-varying pattern of sound characteristics may then be stored in the environmental noise library 134 for later use.

In some embodiments, the environmental noise analysis processor 120 includes a location recognition module 136 and a location library 138. The location recognition module 136 may determine one or more identifying location characteristics associated with the location of the device 100 (e.g., GPS coordinates) and query the location library 138 to determine whether the identifying location characteristics match those corresponding to an identified location that is stored in the location library 138. The location library 138 may include a time-varying pattern of sound characteristics associated with the environmental noise at the identified location. For example, the location may be in or near a factory or office building and the time-varying pattern may include sound characteristics associated with environmental noise from sources such as machines, ventilation systems and the like at that location.

In some embodiments, the one or more identifying location characteristics associated with the location of the device 100 are associated with GPS coordinates or location (or an alternative or competing system such as GLONASS, Galileo, WiFi Positioning and the like). In some embodiments, the one or more identifying location characteristics associated with the location of the device 100 are associated with a WiFi network, such as an WiFi access point (e.g., router), a WiFi hot spot a WLAN network and the like. The one or more identifying location characteristics associated with the location of the device 100 may be associated with a Bluetooth beacon. The one or more identifying location characteristics associated with the location of the device 100 may be associated with a NFC signal (e.g., a known NFC signal that is associated with a location). It will be appreciated that other network or location technologies can be used to provide the identifying location characteristics.

If the identifying characteristics of the location of the device 100 match those corresponding to an identified location that is stored in the location library 138 at the device 100, a text input may be received at the TTS engine 102 at the device 100. The speech output signal may be adapted based on the time-varying pattern of sound characteristics of environmental noise at the identified location that is stored in the location library 138. The device 100 may be operated in a learning mode if the one or more identifying location characteristics associated with the location of the device 100 do not match those corresponding to an identified location that is stored in the location library 138 at the device 100. The device 100 may switch (e.g., automatically switch) to operate in a learning mode to learn one or more identifying location characteristics associated with the location of the device 100, and may learn a time-varying pattern of sound characteristics at the location. The identifying location characteristics and the time-varying pattern of sound characteristics may then be stored in the location library 138 as an identified location for later use.

Figure 3:
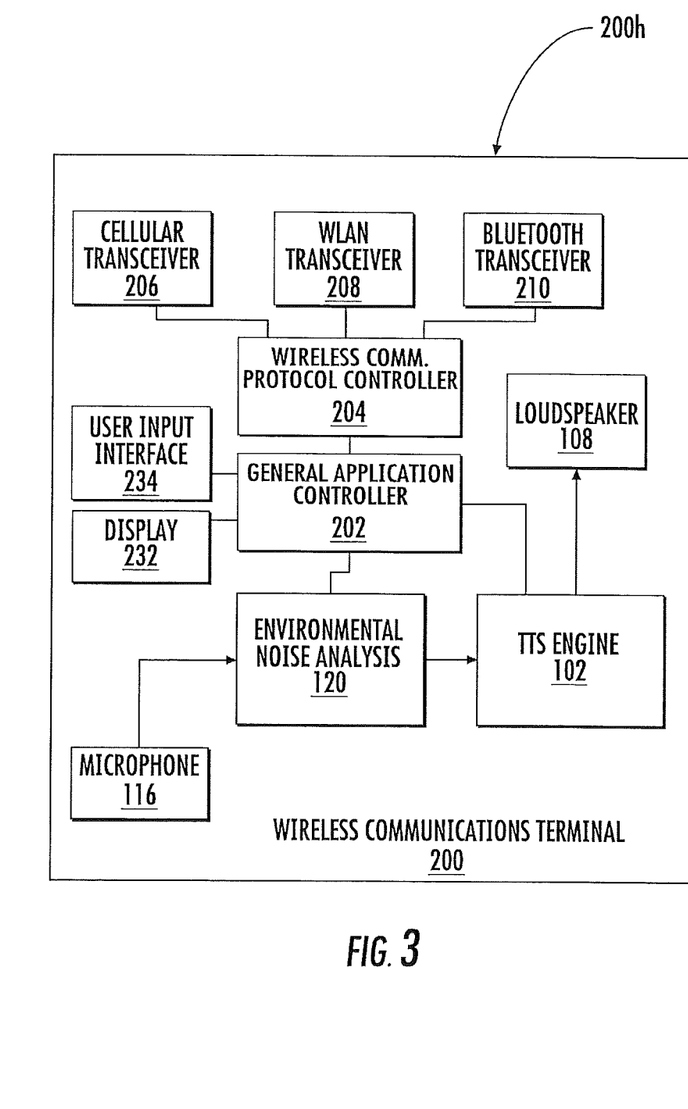
FIG. 3 is a block diagram of a communication terminal and exemplary components thereof according to some embodiments of the present invention.

In some embodiments, the electronic device 100 takes the form of a wireless communications terminal. FIG. 3 is a diagram of a terminal 200 that includes a terminal housing 200h. The illustrated terminal 200 includes a display 232 and a user input interface 234 (e.g., a keypad or touchscreen). The illustrated terminal further includes a general application controller 202, a wireless communication protocol controller 204, a cellular transceiver 206, a WLAN transceiver 208 (e.g., compliant with one or more of the IEEE 801.11a-g standards), and/or a Bluetooth transceiver 210.

The cellular transceiver 206 can be configured to communicate bi-directionally according to one or more cellular standards, such as Long Term Evolution (LTE), enhanced data rates for General Packet Radio Service (GPRS) evolution (EDGE), code division multiple access (CDMA), wideband-CDMA, CDMA2000, and/or Universal Mobile Telecommunications System (UMTS) frequency bands. The terminal 200 may thereby be configured to communicate across a wireless air interface with a cellular transceiver base station and with another terminal via the WLAN transceiver 208 and/or the Bluetooth transceiver 210.

As illustrated in FIG. 2, the terminal 200 may include the components described above in connection with the device 100, including the microphone 116, the environmental noise analysis circuit 120, the TTS engine 102 and/or the loudspeaker 108. One or more of the illustrated components may be omitted from the terminal 200 and/or rearranged within the terminal 200, and it is contemplated that additional components (e.g., one or more additional controllers or processors) may be included.

Figure 4:
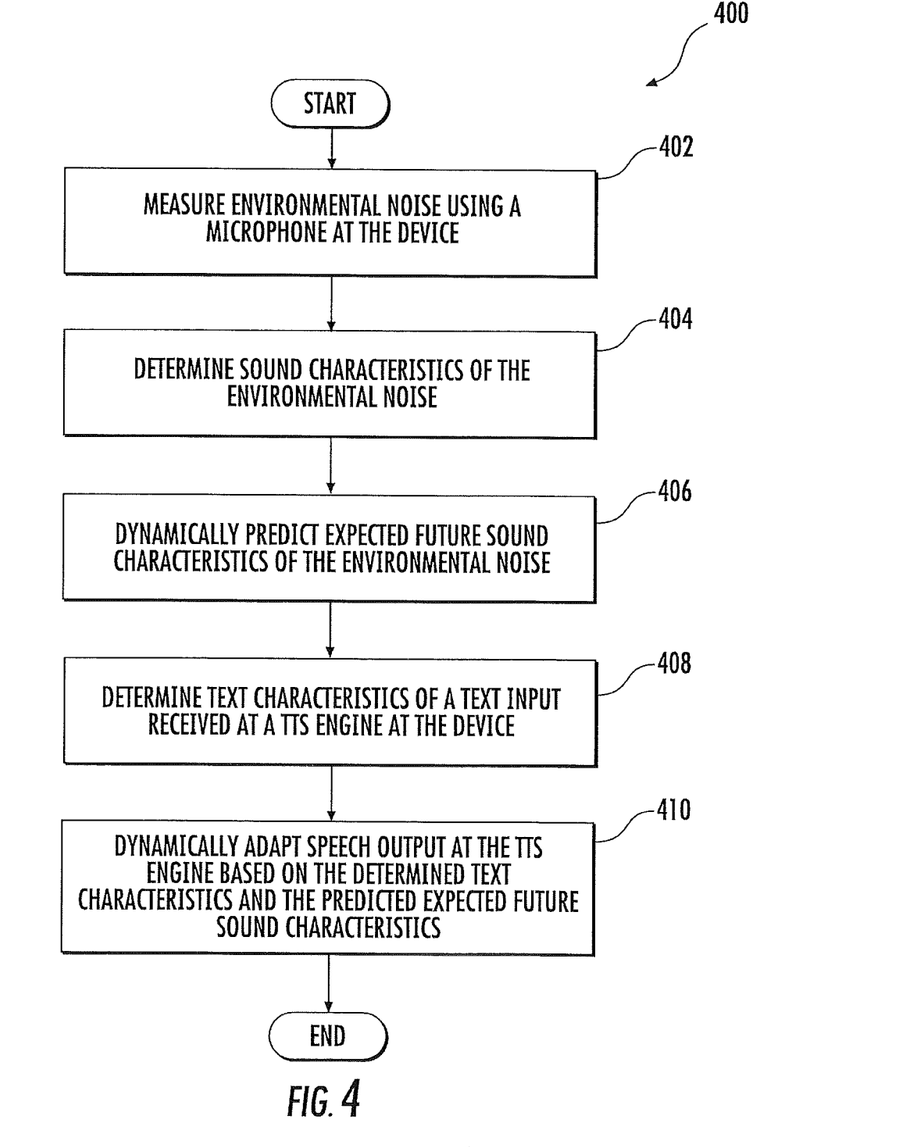
FIG. 4 is a flowchart of methods and operations that may be carried out using by the device of FIG. 1 for compensating for environmental noise in text-to-speech (TTS) speech output.
Figure 5:
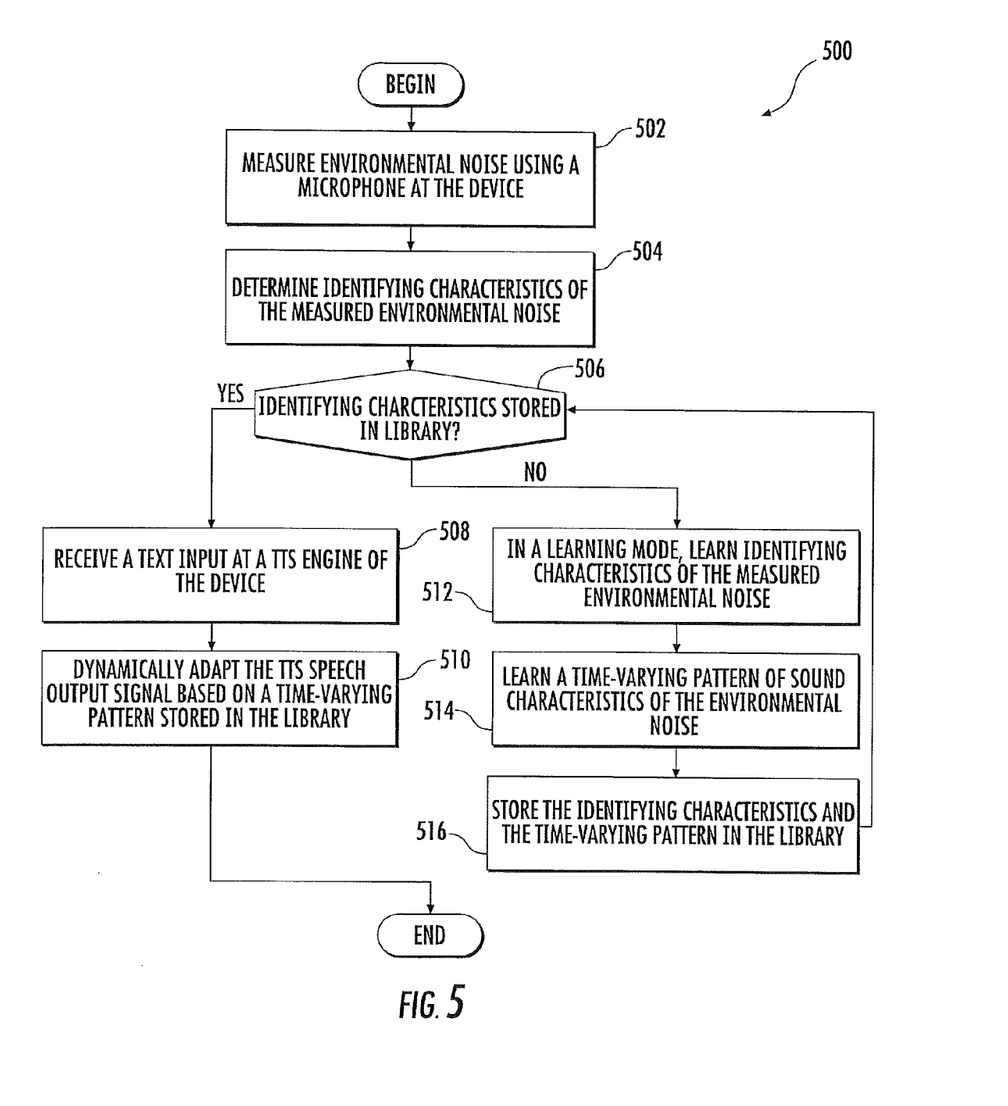
FIG. 5 is a flowchart of further methods and operations that may be carried out using by the device of FIG. 1 for compensating for environmental noise in text-to-speech (TTS) speech output.
Figure 6:
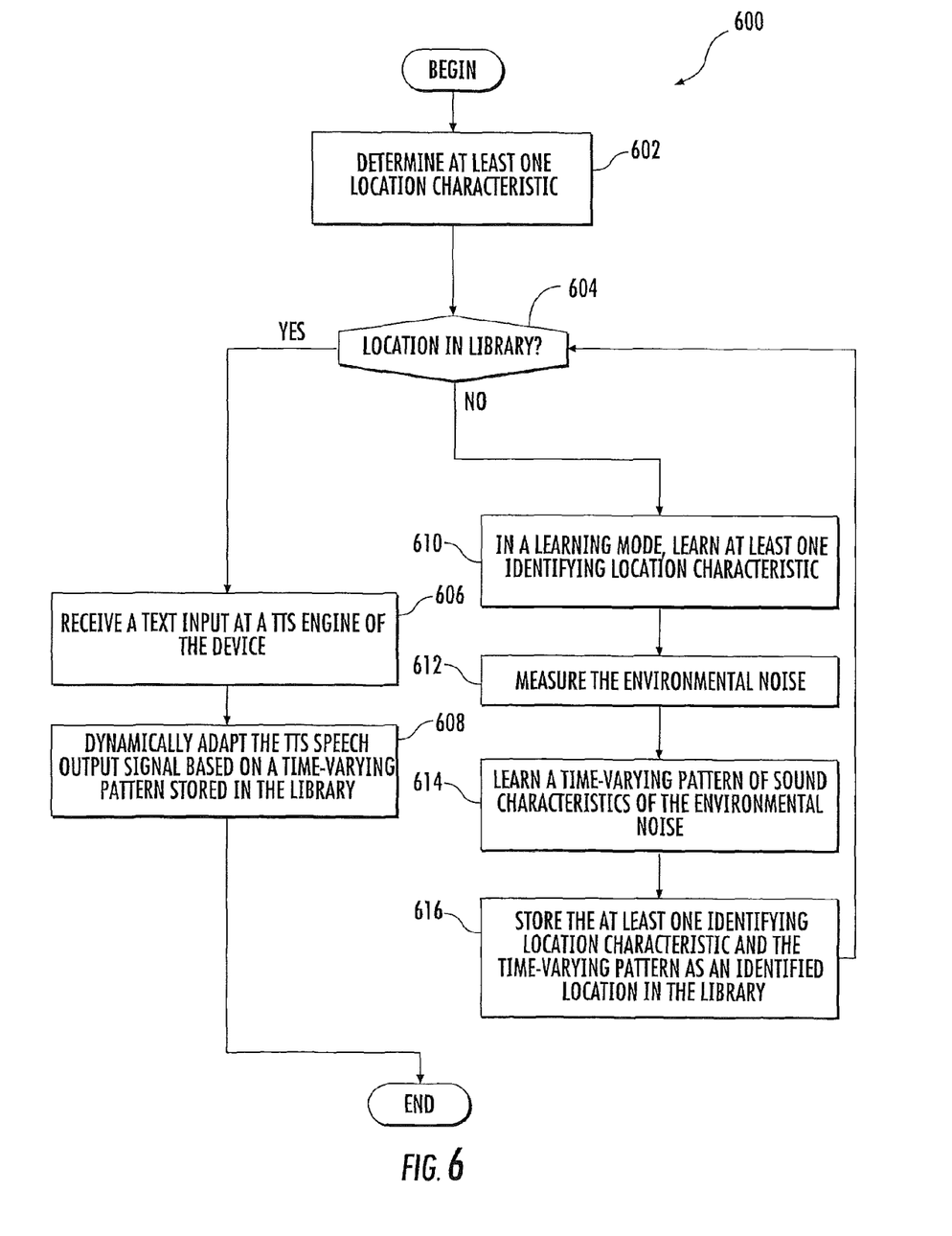
FIG. 6 is a flowchart of further methods and operations that may be carried out using by the device of FIG. 1 for compensating for environmental noise in text-to-speech (TTS) speech output.

Exemplary operations according to embodiments of the invention are illustrated in FIGS. 4-6. Referring to FIG. 4, a method 400 by an electronic device for compensating for environmental noise in TTS speech output includes measuring environmental noise using a microphone signal (e.g., at the device) (Block 402). Sound characteristics of the measured environmental noise are determined (Block 404). Expected future sound characteristics of the environmental noise are predicted based on the determined sound characteristics of the measured environmental noise (Block 406). A text input is received at a TTS engine at the device, and the TTS engine determines text characteristics of the text input (Block 408). The TTS engine is configured to convert the text input into a speech output signal. The speech output signal is adapted at the TTS engine based on the determined text characteristics of the text input and the predicted expected future sound characteristics of the environmental noise (Block 410). The speech output signal may be adapted by varying the pace of the speech output and/or varying the pitch of the speech output.

Referring to FIG. 5, a method 500 by an electronic device for compensating for environmental noise in TTS speech output includes measuring environmental noise using a microphone signal (e.g., at the device) (Block 502). Identifying characteristics of the measured environmental noise are determined (Block 504). A determination of whether the identifying characteristics of the measured environmental noise match those corresponding to an identified environmental noise source that is stored in an environmental noise library at the device (Block 506).

When the identifying characteristics of the measured environmental noise match those corresponding to an identified environmental noise source that is stored in the environmental noise library, a text input is received at a TTS engine at the device (Block 508). The TTS engine is configured to convert the text input into a speech output signal. The speech output signal is adapted based on a time-varying pattern of sound characteristics of the identified environmental noise (Block 510). The time-varying pattern is stored in the environmental noise library. The speech output signal may be adapted by varying the pace of the speech output and/or varying the pitch of the speech output.

When the identifying characteristics of the measured environmental noise do not match those corresponding to an identified environmental noise source that is stored in the environmental noise library, the device is operated in a learning mode including learning identifying characteristics of the measured environmental noise (Block 512) and learning a time-varying pattern of sound characteristics of the environmental noise (Block 514). The identifying characteristics and the time-varying pattern of sound characteristics are stored in the environmental noise library (Block 516).

Referring to FIG. 6, a method 600 by an electronic device for compensating for environmental noise in TTS speech output includes determining one or more identifying location characteristics associated with a location of the device (Block 602). A determination is made as to whether the identifying location characteristics match those corresponding to an identified location that is stored in a location library at the device (Block 604).

If the identifying location characteristics match those corresponding to an identified location that is stored in the location library at the device, a text input is received at a TTS engine at the device (Block 606). The TTS engine is configured to convert the text input into a speech output signal. The speech output signal is adapted based on a time-varying pattern of sound characteristics of environmental noise at the identified location (Block 608). The time-varying pattern is stored in the location library.

If it is determined that the identifying location characteristics do not match those corresponding to an identified location that is stored in the location library, the device is operated in a learning mode including learning one or more identifying location characteristics corresponding to the location of the device (Block 610) measuring the environmental noise (Block 612), and learning a time-varying pattern of sound characteristics of the environmental noise at the location of the device (Block 614). The one or more identifying location characteristics and the time-varying pattern of sound characteristics is stored as an identified location in the location library (Block 616).

The operations described above with reference to FIGS. 4-6 may be carried out by the device 100 described above. It will be appreciated that additional operations are contemplated, including those described above in connection with the described devices and components.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A method by an electronic device for compensating for environmental noise in text-to-speech (TTS) speech output, the method comprising:

measuring environmental noise using a microphone signal;

determining sound characteristics of the measured environmental noise;

dynamically predicting expected future sound characteristics of the environmental noise based on the determined sound characteristics of the measured environmental noise, wherein dynamically predicting expected future sound characteristics of the environmental noise comprises characterizing a time-varying pattern of the expected future sound characteristics of the environmental noise based on a time-varying pattern observed in determined sound characteristics of previously occurring environmental noise;

receiving a text input at a TTS engine at the device, the TTS engine configured to convert the text input into a speech output signal;

determining text characteristics of the text input at the TTS engine; and at the TTS engine, dynamically adapting the speech output signal based on the determined text characteristics of the text input and the predicted expected future sound characteristics of the environmental noise, wherein dynamically adapting the speech output signal comprises varying the pace of the speech output and/or varying the pitch of the speech output;

wherein:

dynamically predicting expected future sound characteristics of the environmental noise based on the determined sound characteristics of the measured environmental noise comprises generating values of a time-varying control curve representing an expected pattern of the environmental noise; and dynamically adapting the speech output signal comprises dynamically adapting the speech output signal using values of the time-varying control curve.

2. The method of claim 1 wherein characterizing a time-varying pattern of the expected future sound characteristics of the environmental noise comprises characterizing expected differences over time in the volume of the environmental noise based on differences over time in volume of previously occurring environmental noise.

3. The method of claim 1 wherein characterizing a time-varying pattern of the expected future sound characteristics of the environmental noise comprises predicting timing of gaps in the environmental noise where the environmental noise volume has less than a threshold amplitude based on differences over time in volume of previously occurring environmental noise.

4. The method of claim 3 wherein dynamically adapting the speech output signal comprises increasing the pace of the speech output such that the speech output is fully carried out within one of the predicted gaps.

5. The method of claim 3 wherein dynamically adapting the speech output signal comprises interrupting the speech output at an interrupted location of the speech output signal at the end of one of the predicted gaps and resuming the speech output from the interrupted location of the speech output signal at a subsequent predicted gap.

6. A method by an electronic device for compensating for environmental noise in text-to-speech (TTS) speech output, the method comprising:

measuring environmental noise using a microphone signal;

determining sound characteristics of the measured environmental noise;

dynamically predicting expected future sound characteristics of the environmental noise based on the determined sound characteristics of the measured environmental noise, wherein dynamically predicting expected future sound characteristics of the environmental noise comprises characterizing a time-varying pattern of the expected future sound characteristics of the environmental noise based on a time-varying pattern observed in determined sound characteristics of previously occurring environmental noise;

receiving a text input at a TTS engine at the device, the TTS engine configured to convert the text input into a speech output signal;

determining text characteristics of the text input at the TTS engine; and at the TTS engine, dynamically adapting the speech output signal based on the determined text characteristics of the text input and the predicted expected future sound characteristics of the environmental noise, wherein dynamically adapting the speech output signal comprises varying the pace of the speech output and/or varying the pitch of the speech output;

wherein characterizing a time-varying pattern of the expected future sound characteristics of the environmental noise comprises characterizing expected differences over time in the frequency spectrum of the environmental noise based on differences over time in the frequency spectrum of the previously occurring environmental noise.

7. The method of claim 1 wherein dynamically adapting the speech output signal comprises varying the pitch of the speech output to compensate for the expected differences over time in the frequency spectrum of the environmental noise.

8. The method of claim 1 wherein the text characteristics of the text input comprises a length of the text and a minimum amount of time needed for intelligible speech output.

9. The method of claim 1 further comprising operating the device in a learning mode to determine sound characteristics of the measured environmental noise.

10. The method of claim 1 further comprising determining a location of the device, wherein dynamically predicting expected future sound characteristics of the environmental noise is based on previously known sound characteristics of environmental noise at the location.

11. The method of claim 1 wherein;

characterizing a time-varying pattern of the expected future sound characteristics of the environmental noise comprises characterizing expected differences over time in the direction of the environmental noise based on differences over time in direction of previously occurring environmental noise; and dynamically adapting the speech output signal comprises panning the speech output to compensate for the expected differences over time in the direction of the environmental noise.

12. An electronic device configured to compensate for environmental noise in TTS speech output, the device comprising:

a microphone configured to measure environmental noise;

an environmental noise analysis circuit configured to:

determine sound characteristics of environmental noise measured by the microphone;

predict future expected sound characteristics of the environmental noise based on the determined sound characteristics of the measured environmental noise;

characterize a time-varying pattern of the expected future sound characteristics of the environmental noise based on a time-varying pattern observed in determined sound characteristics of previously occurring environmental noise to predict future expected sound characteristics of the environmental noise; and predict timing of gaps in the environmental noise where the environmental noise volume has less than a threshold amplitude based on differences over time in volume of previously occurring environmental noise; and a TTS processor configured to:
receive a text input and covert the text input into a speech output signal;
determine text characteristics of the text input; and
adapt the speech output signal based on the determined text characteristics of the text input and the predicted expected sound characteristics of the environmental noise, wherein the TTS processor is configured to adapt the speech output signal by varying the pace of the speech output and/or varying the pitch of the speech output within one of the predicted gaps.

13. The device of claim 12 wherein:
the environmental noise analysis circuit is configured to characterize expected differences over time in the frequency spectrum of the environmental noise based on differences over time in the frequency spectrum of the previously occurring environmental noise; and
the TTS processor is configured to vary the pitch of the speech output to compensate for the expected differences over time in the frequency spectrum of the environmental noise.

14. The device of claim 12 wherein the environmental noise analysis circuit is configured to operate in a learning mode to determine sound characteristics of the measured environmental noise.

15. A method by an electronic device for compensating for environmental noise in text-to-speech (TTS) speech output, the method comprising:
determining one or more identifying location characteristics associated with a location of the device;
determining whether the identifying location characteristics match those corresponding to an identified location that is stored in a location library at the device;

if the identifying location characteristics match those corresponding to an identified location that is stored in the location library at the device:
receiving a text input at a TTS engine at the device, the TTS engine configured to convert the text input into a speech output signal; and
dynamically adapting the speech output signal based on a time-varying pattern of sound characteristics of environmental noise at the identified location, the time-varying pattern being stored in the location library; and if the identifying location characteristics do not match those corresponding to an identified location that is stored in the location library at the device, operating the device in a learning mode including:
learning one or more identifying location characteristics associated with the location of the device;
measuring environmental noise using a microphone signal;
learning a time-varying pattern of sound characteristics of the environmental noise; and
storing the one or more identifying location characteristics of the location and the time-varying pattern of sound characteristics as an identified location in the location library;
wherein (i) the identifying location characteristics are associated with a GPS location or GPS signal and/or (ii) the identifying location characteristics are associated with a WiFi network or an identification thereof.

16. The device of claim 12 wherein the TTS processor is configured to dynamically adapt the speech output signal by increasing the pace of the speech output such that the speech output is fully carried out within one of the predicted gaps.

17. The device of claim 12 wherein the TTS processor is configured to dynamically adapt the speech output signal by interrupting the speech output at an interrupted location of the speech output signal at the end of one of the predicted gaps and resuming the speech output from the interrupted location of the speech output signal at a subsequent predicted gap.

* * * * *

UNITED STATES PATENT AND TRADEMARK OFFICE
CERTIFICATE OF CORRECTION

PATENT NO. : 9,711,135 B2  
APPLICATION NO. : 14/374170  
DATED : July 18, 2017  
INVENTOR(S) : Thorn Page 1 of 1

It is certified that error appears in the above-identified patent and that said Letters Patent is hereby corrected as shown below:

In the Claims

Column 14, Claim 7, Line 27: Please correct "The method of claim 1" to read -- The method of claim 6 --

Signed and Sealed this
Twentieth Day of March, 2018

Andrei Iancu
*Director of the United States Patent and Trademark Office*